No. 11,905. Reissued Apr. 9, 1901.
W. H. WILDER.
OIL STOVE.
Fig. 1.
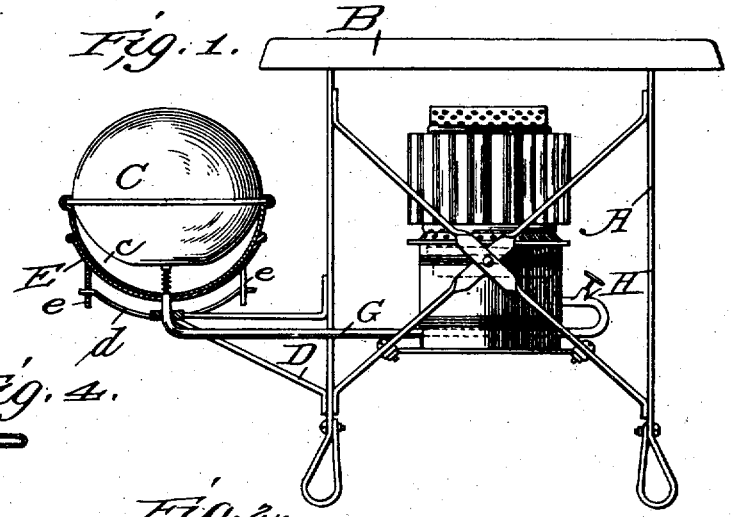
Fig. 4.
Fig. 2.
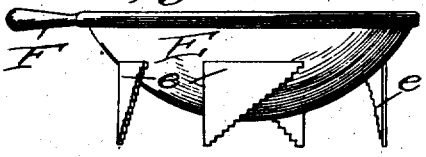
Fig. 3.
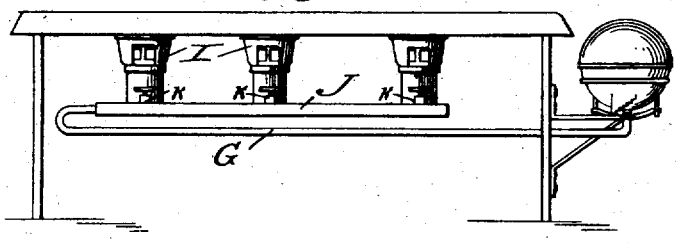
Attest
Commander
H. L. Mockbee.
Inventor
William H. Wilder
by Walter Donaldson & Co.
Attys

UNITED STATES PATENT OFFICE.

WILLIAM H. WILDER, OF GARDNER, MASSACHUSETTS, ASSIGNOR TO HELEN M. WILDER.

OIL-STOVE.

SPECIFICATION forming part of Reissued Letters Patent No. 11,905, dated April 9, 1901.

Original No. 595,231, dated December 7, 1897. Application for reissue filed October 26, 1898. Serial No. 694,649.

*To all whom it may concern:*

Be it known that I, WILLIAM H. WILDER, a citizen of the United States, residing at Gardner, in the county of Worcester and State of Massachusetts, have invented certain new and useful Improvements in Oil-Stoves, of which the following is a specification, reference being had therein to the accompanying drawings.

My invention is designed to provide an oil-stove adapted to be used with petroleum without a wick other than an initial lighting medium; and the object of my invention is to provide a stove in which the burner and oil-reservoir are adjustable in relation to each other, so that the oil-level in the fuel-holder of the burner may be raised or lowered.

In carrying out the invention I employ a reservoir of the type used in the ordinary student-lamp, and thus secure a maintained oil-level, and this level is controlled by raising or lowering the reservoir and its oil-chamber in relation to the burner or by raising or lowering the burner in relation to the reservoir, and it will thus be seen that the level of the oil in the burner may be accurately adjusted to the requirements of the work, and after once adjusted this level will be automatically maintained by the fuel from the reservoir. This construction renders unnecessary the interposition of a valve in a one-burner stove so far as the ordinary operation of a valve is concerned—namely, to control the feed of the oil to the burner—but one may be interposed with advantage in order to cut off or diminish the flow of oil without lowering the reservoir or raising the burner to drain the latter, which otherwise would be necessary, and thus by the use of the valve the adjusted position of the parts may be maintained and the oil additionally controlled. Where two or more burners are used, it is desirable to interpose valves, as it may not be necessary to use all the burners in the same way at one time, and in this case the supply to the burners may be regulated by the valves.

In the accompanying drawings I have shown the invention as applied to a form of stove shown in a companion case filed of even date herewith and marked "Case A."

Figure 1 is a view of a stove with my improvements. Fig. 2 is a detail of the adjusting means for the reservoir. Fig. 3 is a diagram showing the invention as applied to a stove with a series of burners. Fig. 4 is a detail view of the pipe.

In the drawings, A is the frame of the stove surmounted by a top B, and supported within the frame is a liquid-fuel holder having above it a combustion-chamber, both of a construction similar to that particularly shown and described in an application filed April 19, 1897, Serial No. 632,858, and hence not requiring specific description, especially in view of the fact that I do not limit myself in the present case to the application of the invention to any specific form of burner. The reservoir is shown at C and is seated in an oil-chamber *c*, the feed being regulated from the reservoir to the chamber by the inlet of the air, which enters the reservoir and discharges more oil as soon as the level of the oil lowers in the chamber. This is a well-known form of construction. A bracket D extends from the side or end of the stove, and this bracket has four arms *d* extending at right angles, and upon these arms and supported by them is a vertically-movable support E, which may be made slightly bowl shape to receive the reservoir and its chamber. This support E has triangular pieces *e* extending from its under face at equal distances apart, and these pieces are serrated or grooved on their inclined faces and are adapted to rest upon the arms *d*. The support E has a handle F, by which it may be turned, and it will be seen that by this operation the inclined faces of the projections *e* slide over the arms *d*, and thus raise or lower the reservoir and its chamber and change the level of the oil in the fuel-holder of the burner, this level of course being always that of the oil-chamber of the reservoir. The vertical movement of the reservoir and its chamber is permitted by the flexibility of the pipe G, extending between the oil-chamber and the burner, and to secure sufficient flexibility I make the pipe G flattened in cross-section and extend it beneath the burner and make a connection at the side opposite to that on which the reservoir is located, so as to give sufficient length to the connection to allow the necessary vertical movement of the reservoir without straining the connection. A valve H is inserted in this pipe G to limit or shut off the supply of oil altogether when necessary. It will be observed, however, that in a single burner the valve is not essential, as the reservoir can be lowered to drain the burner, and thus operate to render further combustion impossible until the reservoir is again elevated.

In Fig. 3 I have shown a diagram in which the burners are indicated at I, and a main-line pipe J is arranged in front of the burners with a connection therefrom to each burner and with a valve K in each connection. The flexible pipe G extends from the oil-chamber of the reservoir to the end of the main-line pipe J.

It will be understood that instead of making the oil-chamber adjustable in relation to the burner the burner may be made adjustable in relation to the oil-chamber without departing from the spirit of my invention.

While I have used the term "oil" in the description and claims, it will be understood that this includes any kind of liquid fuel.

I claim—

1. A stove comprising a burner, an oil-reservoir in communication with said burner and having a maintained oil-level and means for raising or lowering one of said parts in relation to the other the other part being fixed, substantially as described.

2. A stove comprising a fixed burner, an oil-reservoir in connection with said burner and having a maintained oil-level and means for adjusting the height of the said maintained oil-level in its relation to the burner, substantially as described.

3. A stove comprising a circular burner, an oil-reservoir in connection therewith, and having a maintained oil-level, and means for raising or lowering one of said parts in relation to the other, the opposite part being fixed, substantially as described.

4. The combination with a fixed oil-burner, of a vertically-movable oil-supply tank in communication with said burner, and adapted to maintain a uniform oil-level, and means for raising and lowering said tank in its relation to said burner, substantially as hereinbefore specified.

5. A stove comprising a burner, an oil-reservoir in communication with said burner and having a maintained oil-level, one of said parts being movable vertically in relation to but independent of the other to raise or lower the oil in the burner, substantially as described.

6. A stove comprising a burner having a fixed position horizontally, an oil-reservoir in connection with said burner and having a maintained oil-level and means for varying the relation between the said maintained oil-level and the burner, substantially as described.

7. A stove comprising a burner, an oil-reservoir in connection with said burner and having a maintained oil-level, each of said parts having a fixed position horizontally and means for varying the relation between the said maintained oil-level and the burner, substantially as described.

8. A stove comprising a burner bowl or trough, a combustion-chamber surmounting the same, an oil-reservoir with an oil-chamber having a maintained oil-level and in communication with the bowl by a flexible connection, one of said parts being adjustable vertically independently of the other member.

9. An oil-stove comprising a reservoir having a maintained oil-level, a liquid-fuel holder in communication therewith in which the fuel freely rises, said parts having movement to secure a proper adjustment for normal burning, wherein the oil-level in the reservoir will be the level of the oil in the fuel-holder, and means intermediate of the oil-reservoir and fuel-holder for controlling the depth of oil in the holder below its level at said normal burning, substantially as described.

10. An oil-stove comprising a reservoir having a maintained oil-level, a liquid-fuel holder in communication therewith in which the fuel freely rises, the oil-level in the reservoir being the level of the oil in the holder at normal burning and means intermediate of the oil-reservoir and fuel-holder for controlling the depth of oil in the holder below its normal burning, substantially as described.

11. An oil-stove comprising a reservoir having a maintained oil-level, a series of liquid-fuel holders in communication therewith in which the fuel freely rises, the oil-level in the reservoir being the level of the oil in the fuel-holders at normal burning and independent means for controlling the flow of oil to each holder below the level at normal burning, located between the reservoir and said holders, as set forth.

WILLIAM H. WILDER.

Witnesses:
F. L. MIDDLETON,
H. M. GATES.